Nov. 26, 1968  E. W. ENTERS ET AL  3,412,537
ADJUSTABLE MOUNTING
Filed April 19, 1966  2 Sheets-Sheet 2

Inventors
Edward W. Enters
Norman C. Petersen
By Wheeler, Wheeler & Wheeler
Attorneys United States Patent Office 3,412,537
Patented Nov. 26, 1968

3,412,537
ADJUSTABLE MOUNTING
Edward W. Enters, Fredonia, and Norman C. Petersen, Plymouth, Wis., assignors to Gilson Bros. Co., Plymouth, Wis., a corporation of Wisconsin
Filed Apr. 19, 1966, Ser. No. 543,637
8 Claims. (Cl. 56—25.4)

This invention relates to a mechanism for adjusting the relative position of two parts, and particularly to an adjustable mounting for the mower assembly of a riding mower.

While the invention will be exemplified herein as applied to a riding mower, the mechanism has application in other specific environments and is believed to be novel, per se.

As applied to a riding mower environment, the invention greatly improves and simplifies the up and down adjustment of the cutter housing or mower assembly. Sturdy, positive drive mechanical linkages are provided, preferably one at each of the four corners of the mower assembly, so that uniform pressure is concurrently applied to all four corners of the mower assembly. If desired, counterbalancing springs can be provided to assist the lever in lifting the assembly.

Tooling for the present invention is quite simple, as the same parts are duplicated at all four corners of the mower assembly. A characteristic feature of the invention is the mechanism to convert the rotary movement of a lever-actuated shaft to up and down or rectilinear movement of the mower housing. In accordance with the present invention, this conversion is accomplished in a riding mower environment by a coupling plate which is mounted on the mower blade housing and which has transversely oriented ways, one way being engaged with a fixed or stationary guide bearing or cam on the vehicle frame and the other way being engaged with a movable thrust transmitting bearing or cam mounted on a crank attached to the rotary shaft. The fixed bearing guides the coupling for rectilinear vertical movement, while the movable bearing on the crank transmits shaft movement to the coupling to lift and lower the mower blade housing and, at the same time, permits the movable bearing to reciprocate in the way as the crank moves on its arcuate path.

Other objects, features, and advantages of the invention will appear from the following disclosure in which:

FIG. 3 is an enlarged fragmentary vertical cross section taken through the device on the axis of the rotary shaft on which the control lever is mounted.

FIG. 4 is an enlarged fragmentary vertical cross section taken through the drive shaft for the cutter blade.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
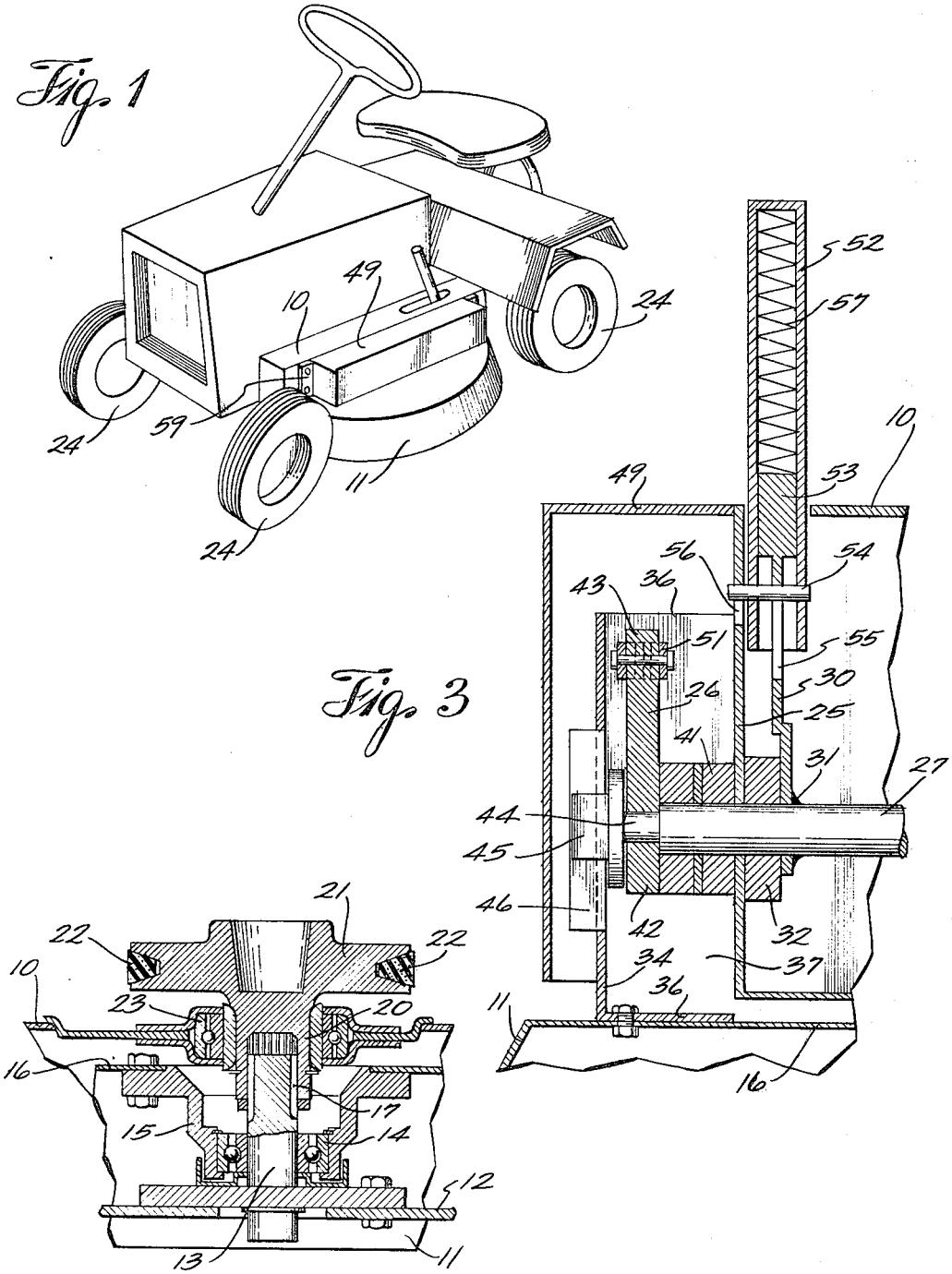
FIG. 1 is a perspective view of a riding mower embodying the present invention.
Figure 2:
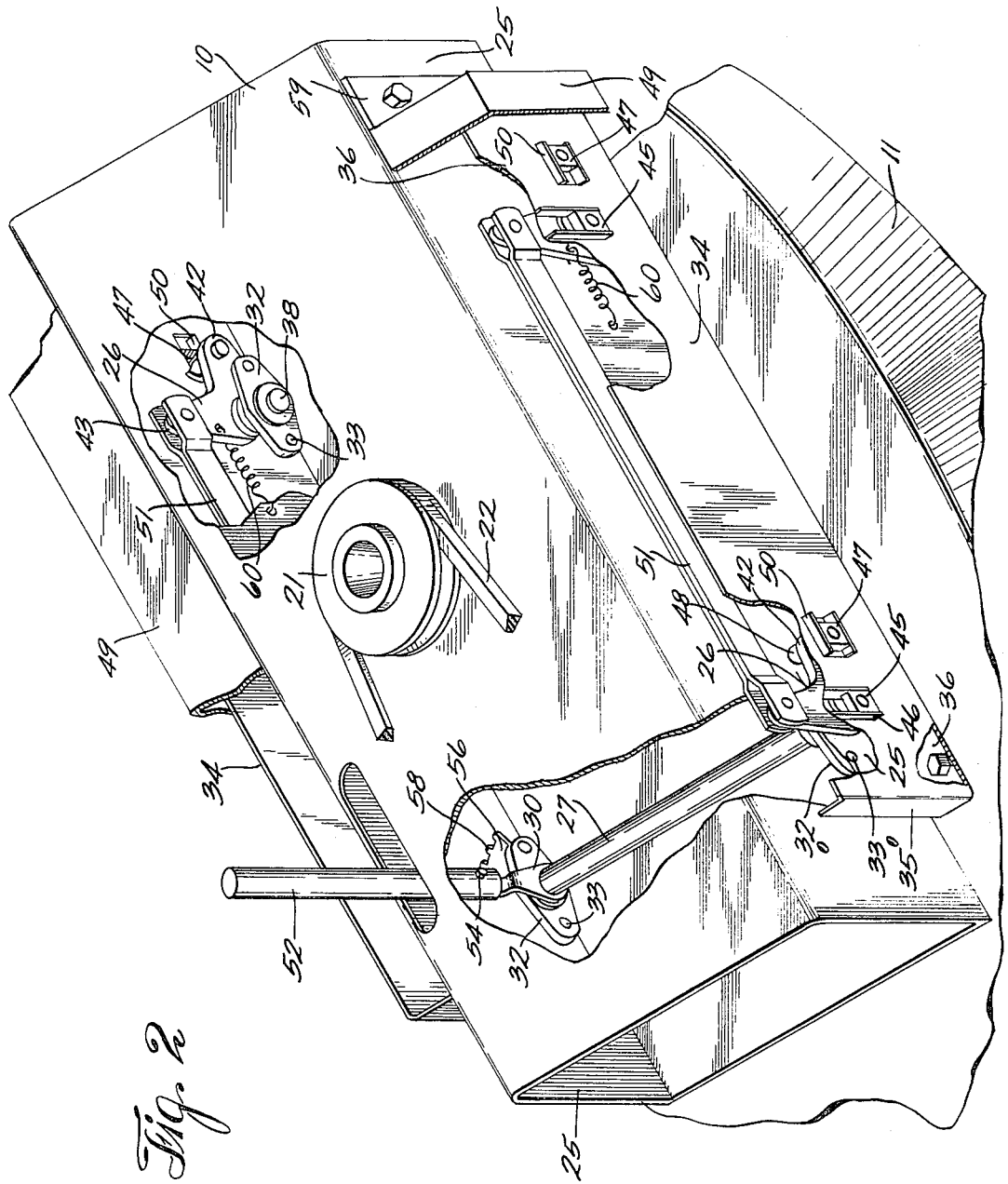
FIG. 2 is an enlarged fragmentary perspective view of the vehicle frame and mower housing and showing in perspective the mechanism for raising and lowering the housing with respect to the frame, portions being cut away and shown in cross section to expose details of the invention.

In general, the riding mower shown in FIG. 1 is conventional. The vehicle has a box section frame 10 from which the mower housing 11 depends. The housing 11 contains therewithin a cutting blade 12, a fragment of which is shown in FIG. 4. The cutter blade is driven by a shaft 13 rotatably mounted in bearing 14 attached by bracket 15 to the top 16 of the housing 11.

The upper end of the shaft 13 is in splined engagement at 17 with the splined socket 20 of the hub of pulley wheel 21 by which power is communicated to the cutter through the belt 22 from the engine (not shown).

Pulley 21 and its splined socketed hub 20 is mounted on a bearing 23 on the upper wall of the vehicle frame 10 and has a relatively fixed position with respect to the vehicle wheels 24. As the housing 11 is raised and lowered with respect to the vehicle frame 10, as hereinafter described, the splined connection 17 between shaft 13 and hub 20 will shorten and lengthen to maintain drive to the blade 12, notwithstanding such movement.

The vehicle frame 10 has laterally spaced upright side walls 25 on which are mounted bearings 32 for the various shafts upon which corresponding bell cranks 26 are mounted. Near the front of the vehicle, the bell cranks 26 at both sides of the vehicle are mounted on a common cross shaft 27 to which control handle lever 30 is also attached, as by welding at 31 (FIG. 3). Lever 30 comprises one form of actuator for the shaft 27 and the crank 26. Bearings 32 in which the shaft 27 turns are attached to the wall 25 by bolts or rivets 33 or the like.

The mower blade assembly housing 11 has its top wall 16 provided with a pair of upright coupling plates 34 which are respectively spaced somewhat outwardly from the side walls 25 of the vehicle frame 10 and have inturned end flanges 35 and bottom flanges 36 to enclose chamber 37 between the respectively spaced walls 25, 34 and within which the bell cranks 26 are housed.

The bell cranks 26 at the rear ends of the mower are supported on separate stub shafts 38 which are axially aligned and rotate in bearings 32. Within the respective chambers 37, the respective shafts 27, 38 are further supported on bearing blocks 41, also fastened to the walls 25 by the bolts or rivets 33.

Near their ends, the respective shafts 27, 38 are keyed to bell cranks 26. Each bell crank has a lift crank arm 42 and a link crank arm 43. Crank arms 42 raise and lower the housnig 11, and crank arms 43 communicate motion from the front shaft 27 to the rear sets of bell cranks 26. Each shaft 27, 38 is provided with axially extending stem portion 44 carrying a stationary guide bearing lug or cam 45 at its end. Each guide 45 desirably consists simply of a square lug, such as a nut, rotatably coupled to the shaft. Alternatively, the ends of shafts 27, 38 could be extended to function as guides in lieu of the lugs 45.

The coupling plates 34 have vertical guideways 46 about the guides 45 so as to constrain movement of the coupling plates 34 to a vertical path. In the disclosed embodiment, the guideways 46 are rectilinear so that the up and down movement of the housing 11 will likewise be rectilinear.

At their ends, the lift arms 42 of the cranks 26 are provided with laterally projecting movable bearings or thrust transmitting cams 47 which are mounted on pins 48 which project laterally from the ends of the crank arms 42. These movable bearings 47 are also desirably square and are embraced by ways 50 formed in coupling plates 34 transversely to ways 46. Ways 50 are also desirably rectilinear.

Accordingly, the coupling plates 34 of the mower assembly housing 11 have transversely related ways 46, 50 respectively engaged with the guides 45 on the vehicle frame and the lift bearings 47 on the crank arms 42. During movement of the housing 11, the bearings 45, 47 simply slide in their respective ways 46, 50.

The respective link arms 43 of the cranks 26 are interconnected by the links 51 so that rotary motion of the shaft 27 will be equally communicated to all of the cranks 26.

Handle 30 is provided with a tubular hand grip 52 which is telescopically received over handle rod 53. To raise and lower housing 11, the operator will grasp the handle 52 and swing it in either direction, thus to rotate shaft 27. Corresponding movement will then occur in each of the cranks 26, and this movement will be communicated by the movable lift bearings 47 to the coupling plates 34 to raise or lower the housing 11. Because of the elongation of the ways 50 in a direction transverse to the movement of the plates 34, bearings 47 can travel on an arcuate path about the axes of the shafts 27, 38. Nevertheless, the mower housing 11 is constrained to rectilinear vertical movement by reason of the engagement of guides 45 in the vertical guideways 46. The ways 50 comprise means for transmitting movement from the actuator 30 to the coupling plate 34 and to the mower housing 11.

The handle tube 52 is provided with a cross pin 54 which is free to reciprocate in the slot 55 in handle 30. The end of pin 54 rides in arcuate ratchet 56 formed in wall 25 and which has a plurality of locking notches 58 into which the pin 54 is biased by spring 57 within the tube 52. Accordingly, the housing 11 can be locked in any one of a number of positions determined by the engagement of the pin 54 and a specific notch 58 in ratchet 56. To shift the housing to another position, the operator depresses the handle tube 52 against the bias of spring 57. This releases the pin 54 to permit free swinging movement of the handle to the next desired position.

As aforestated, there is a bell crank 26 at each of the four corners of the frame 10 and housing 11. Lifting pressure is applied equally at each corner of the housing 11 to smoothly transmit lifting force thereto.

In broad aspects of the invention, the frame 10 and housing 11 constitute two parts which are to be moved toward and away from each other. The bell cranks 26, shaft 27, cams 45, 47, couplings 34 with the transversely related ways 46, 50 respectively engaged with the cams 45, 57 and in which the cams are slidable constitute mechanism for converting the rotary motion of the shaft 27 to the rectilinear motion of the coupling 34.

If desired, one or more springs 60 may be provided between cranks 43 and the vehicle frame wall 25 to counterbalance the weight of the mower blade assembly 11 and assist the lever 52 in lifting the assembly 11.

The mechanism aforesaid is desirably enclosed by a pan-shaped guard or shield 49 attached to frame wall 25 on its out-turned flanges 59.

What is claimed is:

1. In a device having two parts and mechanism for moving said parts in a direction toward and away from each other, the improvement in said mechanism comprising:
    (a) the following elements on one of said parts:
        a guide,
        a crank,
        an actuator to turn the crank,
        a lift bearing on the crank,
    (b) the following elements on the other of said parts:
        a coupling,
        a first way on the coupling aligned in said direction and engaging said guide,
        and a second way on the coupling transverse to the first way and engaging said lift bearing and comprising means for transmitting movement from said actuator to said coupling.

2. The improvement of claim 1 in which there are four corners on the device, each said corner having the elements (a) and (b) of claim 1, and means interconnecting said actuator with all of the cranks.

3. The improvement of claim 2 in which one of said parts comprises the vehicle frame of a riding mower and the other of said parts comprises the mower blade assembly of said riding mower.

4. In a riding mower having a vehicle frame, a mower blade assembly pendent therefrom and adjustable mechanism for moving the mower blade assembly in a direction to raise and lower it with respect to said frame, the improvement in said mechanism comprising:
    (a) said vehicle frame having a guide, a rotary shaft, and an actuator for the shaft, a crank on the shaft and a lift bearing on the crank,
    (b) said mower blade assembly having a coupling, a first way on the coupling aligned in said direction and engaging said guide and a second way on the coupling transverse to the first way and engaging said lift bearing and comprising means for transmitting movement from said actuator to said mower blade assembly.

5. The riding mower of claim 4 in which said first way is rectilinear to require the mower assembly to move on a rectilinear path.

6. The riding mower of claim 4 in which the vehicle frame comprises laterally spaced side plates, said coupling comprising complementary plates movable along the vehicle frame side plates, corresponding portions near the ends of said plates defining four corners, each said corner having the elements (a) and (b) of claim 4, said actuator comprising a single control lever and means interconnecting said lever with all the cranks.

7. The riding mower of claim 6 in combination with a counterbalancing spring reacting between the vehicle frame and a crank to assist the lever in raising the mower assembly.

8. The riding mower of claim 4 in combination with a guard enclosing said adjusting mechanism.

References Cited

UNITED STATES PATENTS

| | | | |
|---|---|---|---|
| 810,308 | 1/1906 | Salzer | 74—104 |
| 2,581,321 | 1/1952 | Fletcher | 74—104 X |
| 2,928,223 | 3/1960 | Danuser | 56—25.4 |
| 2,945,338 | 7/1960 | Burrows et al. | 56—25.4 |
| 3,063,226 | 11/1962 | Peauser | 56—25.4 |
| 3,093,948 | 6/1963 | Root | 56—25.4 |
| 3,169,358 | 2/1965 | Ertsgaard et al. | 56—25.4 |
| 3,187,120 | 6/1965 | Akst | 74—104 |
| 3,283,486 | 11/1966 | Marek et al. | 56—25.4 |
| 3,357,165 | 12/1967 | Thon | 56—25.4 |

ALDRICH F. MEDBERY, *Primary Examiner.*